W. M. DECKER.
COMBINED BREAST AND NIPPLE FOR NURSING BOTTLES
APPLICATION FILED AUG. 11, 1909.
982,776.
Patented Jan. 24, 1911.
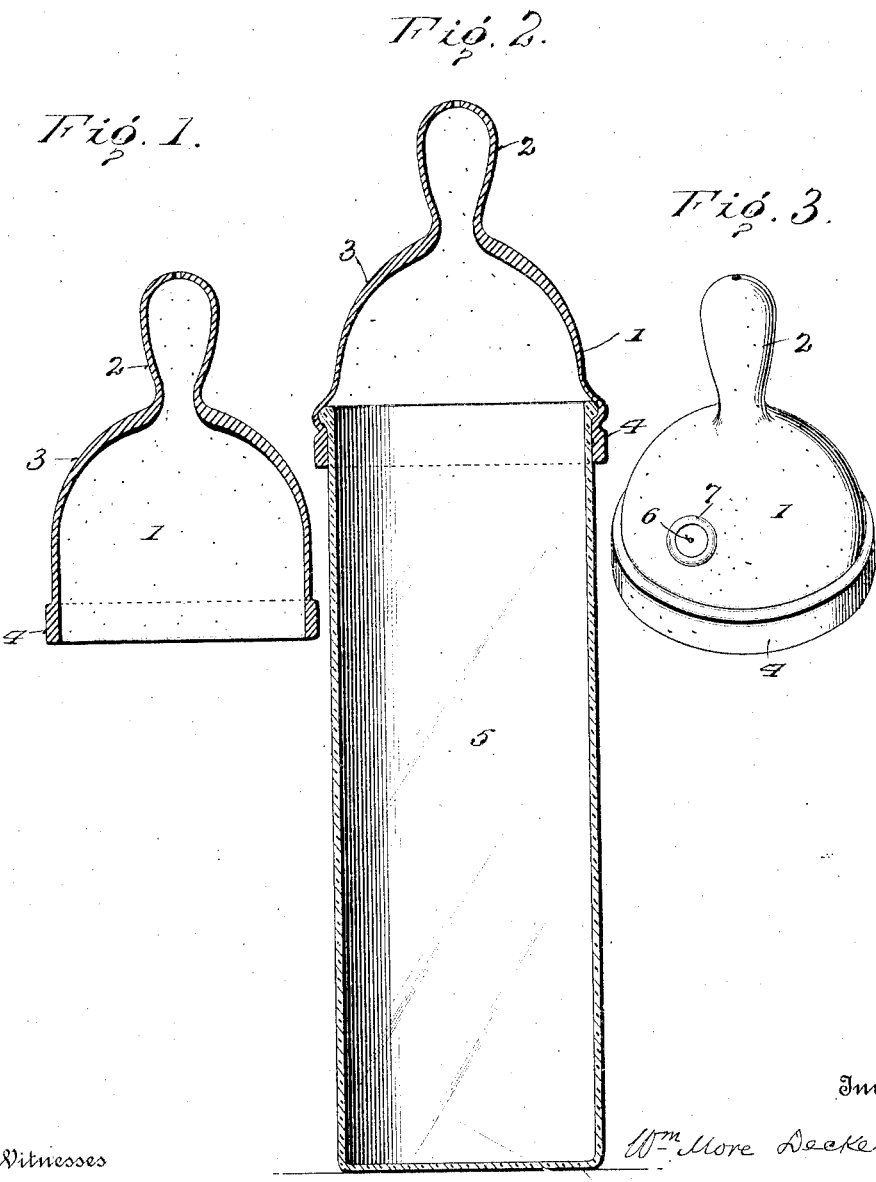
Witnesses
Inventor
Wm More Decker
By
Attorney

UNITED STATES PATENT OFFICE.

WILLIAM MORE DECKER, OF BUFFALO, NEW YORK.

COMBINED BREAST AND NIPPLE FOR NURSING-BOTTLES.

982,776.  Specification of Letters Patent.  Patented Jan. 24, 1911.

Original application filed May 4, 1909, Serial No. 493,881. Divided and this application filed August 11, 1909. Serial No. 512,444.

*To all whom it may concern:*

Be it known that I, WILLIAM MORE DECKER, a citizen of the United States, residing at Buffalo, in the county of Erie and State of New York, have invented certain new and useful Improvements in Combined Breasts and Nipples for Nursing-Bottles; and I do hereby declare the following to be a full, clear, and exact description of the invention, such as will enable others skilled in the art to which it appertains to make and use the same.

My invention relates to certain new and useful improvements in a composite flexible breast and nipple for use in connection with food receptacles, as fully set forth in an application for Letters Patent for improvements in nursing devices filed by me May 4, 1909, Serial No. 493,881, and of which this is a division.

My present invention has for its object to provide a combined or integral breast and nipple which shall involve economy of material, adaptability for ready cleansing, non-collapsing of the nipple and breast during the withdrawal of the food from the receptacle, prevention of an infant's taking into its mouth any portion of the breast; and the securement of the ready and natural flow of the food.

With these ends and objects in view, my invention consists in the details of construction hereinafter more fully set forth.

In the pending application referred to, I have shown and described a collapsible food receptacle contained within, and supported by a rigid non-flexible jacket, and closed by a combined breast and nipple such as constitutes the subject-matter of my present application, but as the collapsible food receptacle and its supporting jacket may be advantageously used in connection with a breast and nipple other than that shown and described, I have in another divisional application made claim to the same, and as the combined breast and nipple may also be used in connection with any suitable food receptacle, my present application is designed to secure protection for the details of construction involved in my improved breast and nipple as a new article of manufacture.

In order that those skilled in the art to which my invention appertains may know how to make my improved device and fully appreciate its advantages, I will proceed to describe the same, referring by numerals to the accompanying drawing in which:

Figure 1 is a central vertical section of a breast and nipple embodying the features of my invention. Fig. 2 is a similar view showing the improved breast and nipple applied to a food receptacle; and Fig. 3 is a perspective view of the breast and nipple.

Similar reference numerals indicate like parts in the several figures of the drawing.

1 represents the breast composed of flexible material such as rubber, and 2 is a nipple formed integral with the breast.

At the base of the nipple and at the point of juncture thereof with the breast, the nipple and breast are reinforced as clearly shown at 3, said reinforcement vanishing about midway between the base of the nipple and the base of the breast, as clearly shown.

The base extremity of the breast is formed with a flat strengthening rib 4, in order that it may make a satisfactory air- and liquid-tight joint with any suitable food receptacle 5; the raised portion of this rib is on the exterior of the breast and it is of such extent in cross-section that the breast will be held at such locality in close contact with the food receptacle.

The presence of the reinforce 3, enables the nipple and the body of the breast below the reinforced zone, to be made comparatively thin and thus great economy in the use of rubber is secured. This reinforce also prevents the nipple from collapsing at its base, and likewise aids in preventing the collapsing of the breast, thus insuring the free flow of the contents of the food receptacle, and it also constitutes a shield and prevents an infant from taking into its mouth more than the nipple. This reinforcing zone being between the nipple and the breast and permitting the entire remainder of the device to be made comparatively thin and flexible, not only results in economy in the use of rubber, as stated, but gives to the structure in its entirety, a flexibility approaching that of a mother's breast, and aids materially in the discharge or withdrawal of the contents of the food receptacle. Furthermore, by reason of the locality of the reinforce and the ability to provide for extreme thinness or attenuation of the balance of the entire structure renders it exceedingly easy to turn the integral structure inside out to thoroughly cleanse the same, as the base of the nipple when the reinforce begins acts as a hinge upon which the nipple may first be turned or forced within the breast and the latter then turned inside out, thus exposing the entire inside surfaces of both the nipple and the breast.

At a suitable distance above the base of the breast, the breast is formed with a vent 6, which when the breast is properly secured upon the food receptacle, will be above the upper extremity of the latter. As this vent is necessarily very small and may not be readily visible, and in order that in adjusting the breast upon the food receptacle the vent shall be properly located with reference to the upper end of the latter, I prefer to surround the vent with a raised rib 7 which not only serves to indicate the locality of the vent, but also insures the proper action of the same. This vent coöperating with the reinforce hereinbefore referred to, prevents the collapse of the breast and nipple and renders nursing easier for an infant, as air is permitted to enter the food receptacle as rapidly as the food is withdrawn, and consequently no vacuum or unequal atmospheric pressure occurs to retard the flow of the food. The presence of this vent and its effect of preventing the tendency to the collapsing of the nipple and the breast avoids the necessity of exaggerating the reinforce at the juncture of the nipple and breast and aids in the economy of material in the entire structure. The rib 4 at the base of the breast being flat tends to produce a tighter and more extensive joint between the breast and the food receptacle than would be the case of a rib semicylindrical in cross-section.

Having described the construction and advantages of my improved breast and nipple, what I claim as new and desire to secure by Letters Patent is:—

In a composite breast and nipple, an elastic dome-shaped breast composed of flexible resilient material and a bulb-shaped nipple formed therewith of similar material, said breast and nipple having a thickened reinforcement at the point of juncture between the said parts, said reinforcement diminishing downwardly toward the base of the breast and vanishing about midway between the base of the nipple and the base of the breast, and a vent in the breast at a predetermined distance above the base of the breast.

In testimony whereof, I have signed my name to this specification in the presence of two subscribing witnesses.

WM. MORE DECKER.

Witnesses:
    ESTELLE OLDAY,
    ALBERT CHIBSON.